United States Patent [19]

Eberhard et al.

[11] Patent Number: 4,638,499
[45] Date of Patent: Jan. 20, 1987

[54] HIGH RESOLUTION COLLIMATOR SYSTEM FOR X-RAY DETECTOR

[75] Inventors: Jeffrey W. Eberhard, Schenectady; Dallas E. Cain, Scotia, both of N.Y.

[73] Assignee: General Electric Company, Schenectady, N.Y.

[21] Appl. No.: 875,021

[22] Filed: Jun. 16, 1986

Related U.S. Application Data

[63] Continuation of Ser. No. 638,171, Aug. 6, 1984, abandoned.

[51] Int. Cl.⁴ .............................................. G21K 1/02
[52] U.S. Cl. ........................................ 378/7; 378/4; 378/19; 378/147; 378/149; 378/153; 378/154; 250/385
[58] Field of Search ................. 378/7, 4, 19, 147, 149, 378/153, 154; 250/385

[56] References Cited

U.S. PATENT DOCUMENTS

| | | | |
|---|---|---|---|
| 4,138,721 | 2/1979 | Boyd | 364/414 |
| 4,303,863 | 12/1981 | Raez et al. | 378/19 |
| 4,392,237 | 7/1983 | Houston | 378/51 |
| 4,394,578 | 7/1983 | Houston et al. | 250/374 |
| 4,433,427 | 2/1984 | Barnes | 378/149 |

Primary Examiner—Bruce C. Anderson
Assistant Examiner—Jack I. Berman
Attorney, Agent, or Firm—Donald R. Campbell; James C. Davis, Jr.; Paul R. Webb, II

[57] ABSTRACT

High resolution in an X-ray computerized tomography (CT) inspection system is achieved by using a collimator/detector combination to limit the beam width of the X-ray beam incident on a detector element to the desired resolution width. In a detector such as a high pressure Xenon detector array, a narrow tapered collimator is provided above a wide detector element. The collimator slits have any desired width, as small as a few mils at the top, the slit width is easily controlled, and they are fabricated on standard machines. The slit length determines the slice thickness of the CT image.

3 Claims, 7 Drawing Figures

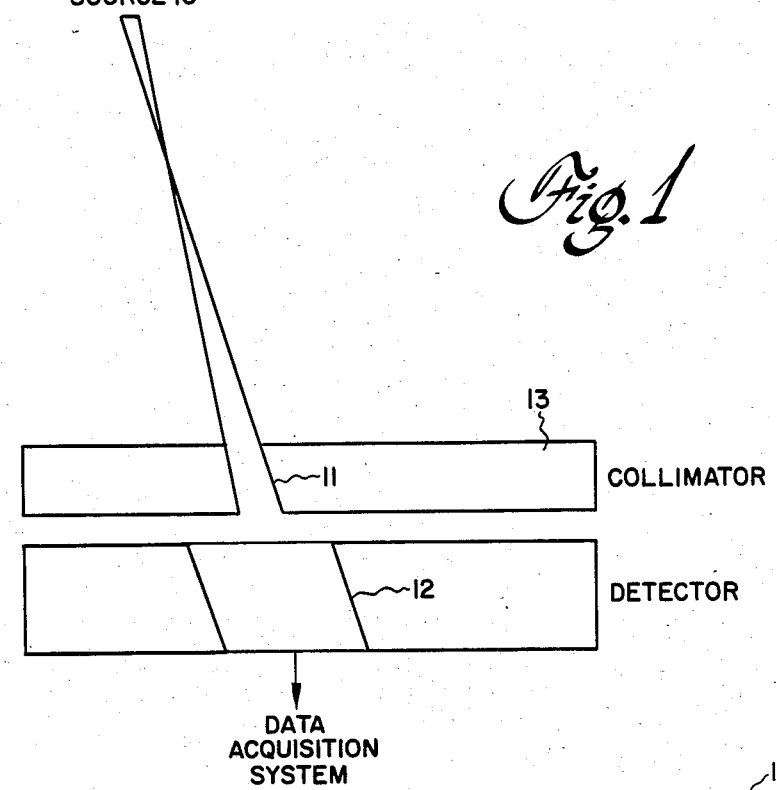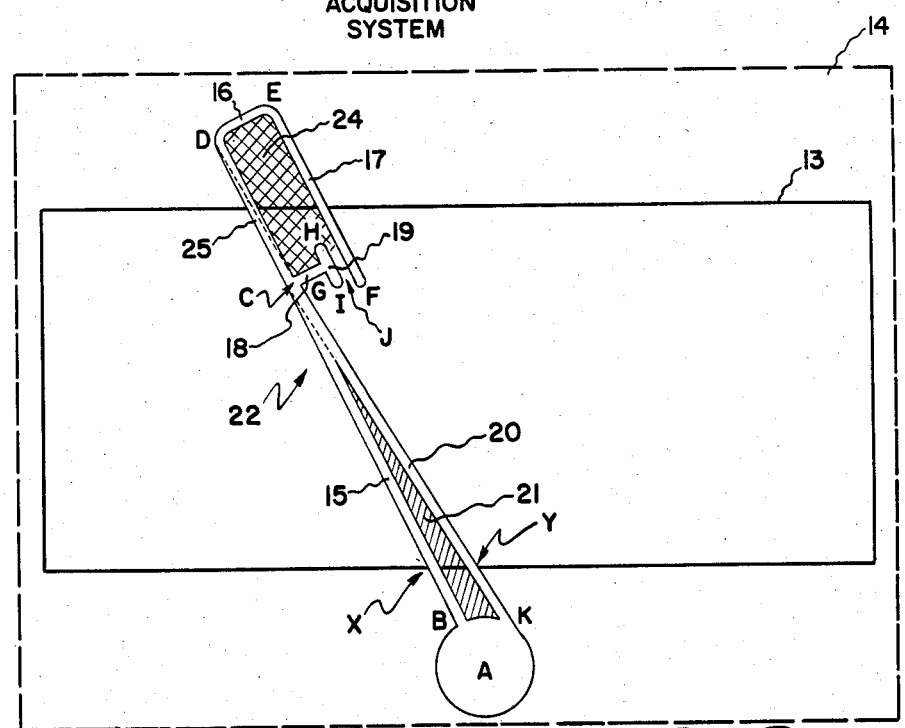

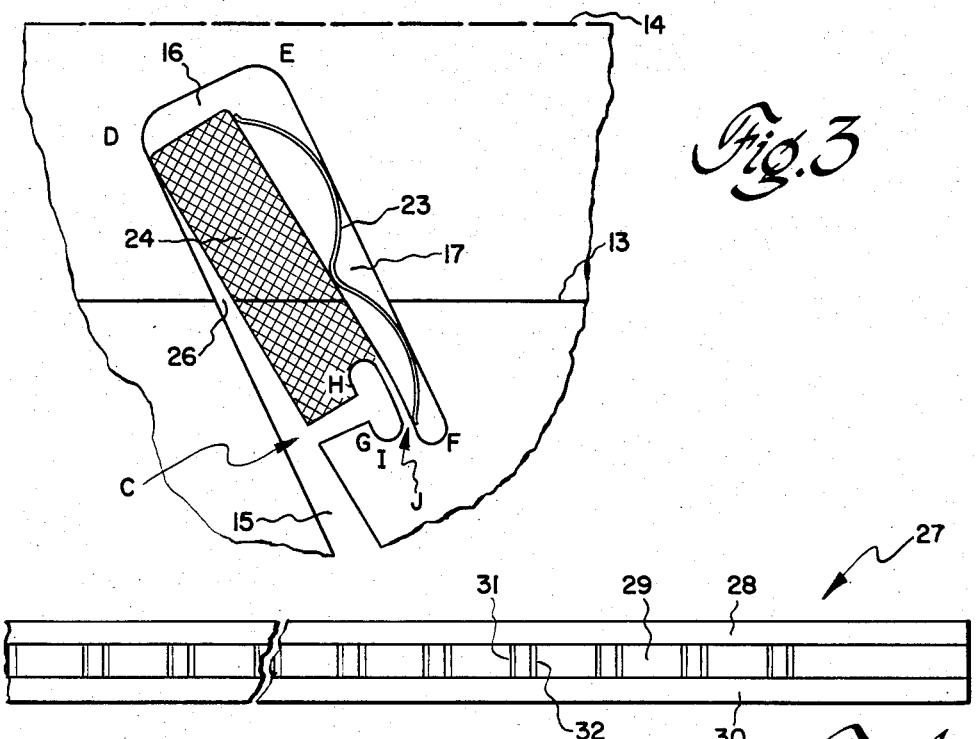
Fig. 3
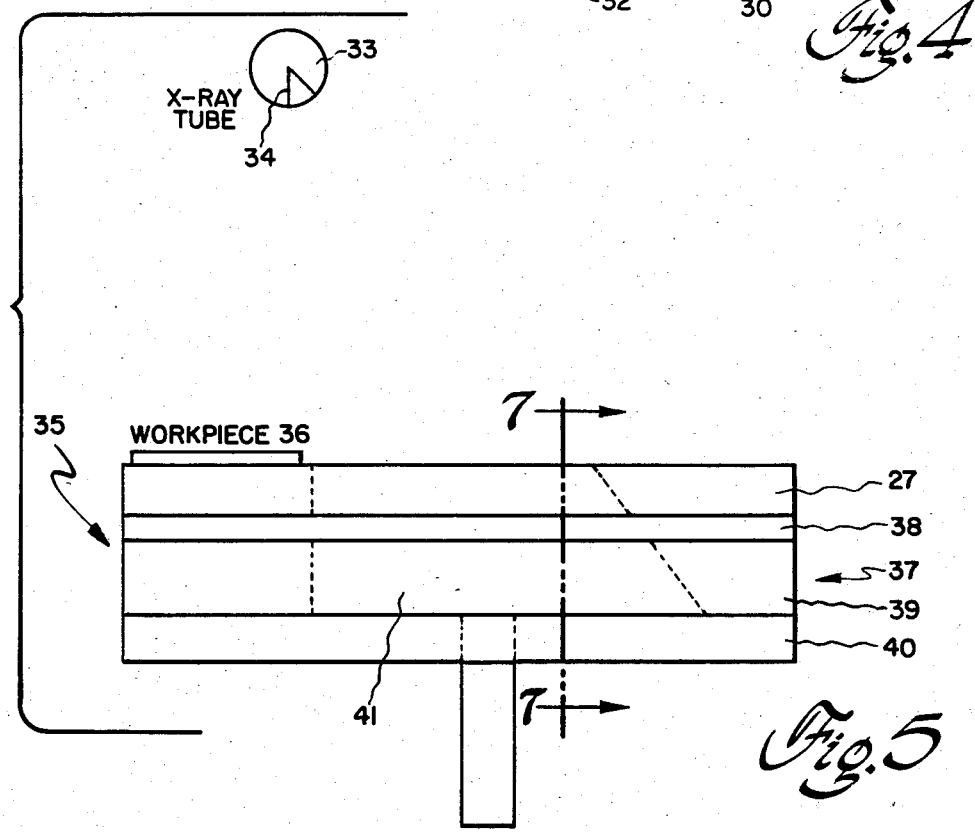
Fig. 4
Fig. 5

HIGH RESOLUTION COLLIMATOR SYSTEM FOR X-RAY DETECTOR

This application is a continuation of application Ser. No. 638,171, filed Aug. 6, 1984, now abandoned.

BACKGROUND OF THE INVENTION

This invention relates to improved detectors especially for industrial and medical computerized tomography, and more particularly to a collimator system for X-ray detectors which provides much higher resolution than a stand alone X-ray detector.

Industrial X-ray Computerized Tomography (CT) systems are designed to provide images of the internal structure of manufactured parts. In order to effectively image small. structures or defects, high resolution measurements are required. A major limitation to the resolution achievable in the past is found in the structure of the X-ray detector itself. This invention comprises a way of dramatically improving the resolution of the detector system.

Typical X-ray detectors in current use for CT systems are Xenon ionization chambers. The operation of such detectors is described in U.S. Pat. No. 4,394,578 and other commonly assigned U.S. patents of J. M. Houston and N. R. Whetten. It consists essentially of a parallel plate capacitor with high pressure Xenon gas as the dielectric. A printed circuit board implementation consists of a high voltage plate at a fixed separation from a ground plate. The incident X-rays ionize the Xenon gas, and the ions are attracted to the voltage plates. The charge is collected and transferred to a charge to voltage converter, and the resulting voltage is digitized and sent to a computer. The amount of charge collected is proportional to the incident X-ray flux. If more than one detector is required, as is the case for CT systems, the ground plate contains several metallized regions, separated by narrow insulating strips.

The resolution of the detector is determined, to first order, by the width of the metallized regions. The Xenon ions are attracted by the electric field to the nearest plate of opposite charge. For wide metal regions, this is a sufficient approximation. For narrow metal strips, however, the spread of the primary electrons and other radiations produced by the X-rays in the detector must be taken into account. Because of the effect, the ions do not always arrive at the nearest metal strip. The ions can, in fact, find their way to strips several elements away. This effect, known as crosstalk, limits the resolution of these detectors rather severely as metal strip width becomes small. It has been shown that for strips on 0.003 inch centers, the response of a neighboring channel is about 65% of the response of the desired channel. This behavior is a serious problem if very high resolution is required.

SUMMARY OF THE INVENTION

In order to achieve resolution on the order of 10 mils and less, the X-ray detector array has wide detector elements, but the beam width of the incident X-ray beam is limited to the desired resolution width with a collimator. A narrow, tapered collimator above a wide detector element is the geometry of this invention. The collimator is immediately adjacent to the detector housing and is made of tungsten or another high X-ray attenuating material.

The X-ray detector is comprised of collector and voltage plates between which an electric field is impressed, and the housing contains a gaseous medium, such as high pressure Xenon, to convert incident X-rays into charged particles. The collimator has a plurality of narrow tapered slits, approximately centered on the associated detector, to define the width of the X-ray beam and hence the system resolution. All of the charged particles formed in a wide detector element are collected and there is no crosstalk between channels The collimator has a three-layer construction, a central layer in which the tapered slits are cut and two continuous side layers enclosing the slits (the thickness of the central layer determines the slice thickness in a CT system). A technique to fabricate collimators with the desired small slit width on standard EDM machines is given. The top of the slit can be made to have a selected width, 0–10 mils usually, and the width is easily controlled. The collimator has, at the top of the slit, a flexure piece that is pressed by a spring against the edge of the slit; the tapered slit has zero width at the top and any desired width at the bottom next to the detector. The upper part of the central layer is ground off at a point where the top of the slit has the selected dimension.

A limited-angle X-ray CT inspection system is disclosed. The invention can be used in other X-ray systems where high resolution is a critical goal, and in specialized medical CT systems.

BRIEF DESCRIPTION OF THE DRAWINGS

FIG. 1 is a sketch showing one element of a collimator/detector to limit the effective beam width of X-rays to achieve high resolution.

FIG. 2 is a plan view of the central collimator sheet illustrating fabrication of a tapered slit.

FIG. 3 shows a portion of FIG. 2 and activation of the flexure to narrow the slit width at the top.

FIG. 4 is a fragmentary top view of the collimator.

FIG. 5 is a simplified system diagram of the industrial X-ray scanner and collimator/detector.

DETAILED DESCRIPTION OF THE INVENTION

Figure 6:
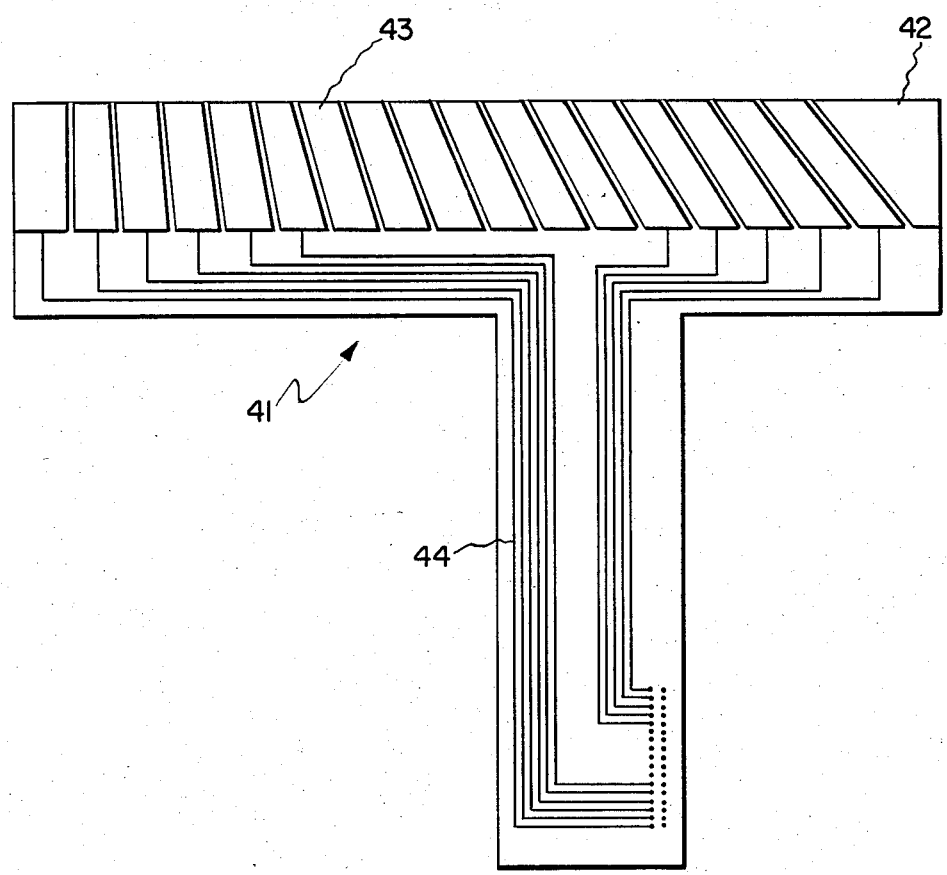
FIG. 6 shows a detector printed circuit collector board having wide signal electrodes.

One geometry for an X-ray CT inspection system is shown in FIG. 1. The workpiece of interest is scanned directly above the collimator, which defines the X-ray beam width of radiation emitted from X-ray source 10, and hence the system resolution. A narrow, tapered collimator slit 11 above and aligned with a wide X-ray detector element 12 is the geometry of this invention. In one reduction to practice, the top of collimator slit 11 is about 0.003 inches wide and the bottom is about 0.013 inches wide. The collimator plate 13 is made of tungsten because of its high X-ray attenuation, or another such material.

The challenge was to develop a technique to fabricate collimators with the desired small slit width. Conventional machining techniques are incapable of providing slits of the desired geometry. Therefore, a technique using Electric Discharge Machining (EDM) was developed. The critical features of the invention are the ability to fabricate a slit of any desired width, the ability to easily control the slit width, and the ability to fabricate the collimators on standard EDM machines without the need for large amounts of specialized equipment.

The technique for cutting a collimator of this geometry using Electric Discharge Machining is described in conjunction with FIG. 2. This description is concerned with only one collimator element, though a long series of elements are cut from the same piece of tungsten. In addition, the description concerns only the center piece of a three layer collimator. The outer two layers are simply tungsten sheets of the same final dimensions as the center layer. The thickness of the center layer determines the slice thickness of the CT image.

The dashed line in FIG. 2 depicts the borders of the tungsten sheet 14 under consideration. Its size is not particularly important since the collimator plate is later cut to the boundaries shown by the solid rectangular line 13. The initial step is to drill a hole A in sheet 14. The EDM wire is then threaded through this hole and moved along the path ABCDEF, cutting the thin slot 15, perpendicular slot 16 and short parallel slot 17. The width of the cuts is about 6 mils if a 4 mil wire is used. The wire is retraced along the path FEDC, jogs out to GHI and returns to C. This cuts the perpendicular slot 18 which intersects the middle of parallel slot 19, defining a flexure at J between slots 17 and 19. The flexure is cut last to minimize troublesome movements of piece 24 during cutting. Sheet 14 should be annealed and stress free to further avoid movement during cutting. The cut is completed by moving the wire along the path CKA, creating angled thin slot 20. Several critical points occur in the diagram. Point K is chosen so that the distance from X to Y is the desired bottom slit width. Point C is determined by the location where the slit width is equal to the wire cutting dimension. Point D is chosen so that the left hand edge of the cut at D, and the right hand edges of the cut at C and K, lie along a straight line (which eventually forms one edge of the slit).

Once the cut from C to K is made, the dashed section of metal 21 is free and can be removed. The portion of the tapered slit 22 from point C to the bottom of the collimator is now complete. Next, referring also to FIG. 3, a metal spring 23 is placed in the thin slot 17 at and below point E to force the cross-hatched metal flexure piece 24 (CDEH) to the dashed line position 25 in contact with the edge of the slot at D. The basic tapered slit 22 (BDK) is now in place. It starts with zero width at the top and tapers to any desired width at the bottom. The outer two plates of the collimator are then epoxied in place, and a final grind is made to define the top surface of the collimator. By choosing the position of this top surface, the top of the slit indicated at 26 can be made to have any desired width.

This collimator has the advantages of relative simplicity and ease of determining the top slit dimension. It provides essentially one piece construction, and requires no final size adjustment using shims. It can be fabricated with standard EDM equipment and requires no specialized laboratory techniques.

In FIG. 4 is shown the top view of a completed three-part collimator assembly 27 having central and side layers 28-30 and many collimator slits 31. Slits 32 are blind holes, the portion of slots 17 not grouhd off. The top width of slit 31 is, for instance, 0.003 inches, and the slit length, corresponding to the slice thickness of the CT system, is 0.1 inch or any other selected dimension. Each narrow collimator slit 31 defines the width of the X-ray beam incident on the associated detector element and hence the X-ray system resolution.

FIG. 5 is a simplified system diagram of an X-ray Computerized Tomography inspection apparatus to provide internal images of long, narrow parts. Conventional circular CT geometry is inappropriate for such parts because X-rays cannot penetrate long lengths of metal and because the large separation required between source and detector causes loss in signal level and alignment difficulties. This Limited Angle Translation S.ystem overcomes these difficulties. The X-ray penetration problem prevents inspection over the entire 180° angular range, therefore a limited angle reconstruction algorithm is used to generate images from the data available over a 140° range The large separation between source and detector is minimized by replacing the standard part rotational motion by a translation motion past an array of detectors aimed at the X-ray source over a range of angles. High resolution is achieved by using the collimator/detector combination to limit the effective beam width.

The X-ray beam emitted by an X-ray tube 33 is shaped by a collimator (not shown) into a 40° fan beam as indicated by the symbol 34. The X-ray source is movable as explained in copending application Ser. No. 382,329, filed May 26, 1982, now U.S. Pat. No. 4,500,785, N. R. Whetten and J. E. Kelly, "Radiation Detector Having a Multiplicity of Individual Detecting Elements", assigned to DOE, which discloses a limited-angle translation system. The collimator/detector 35 is mounted horizontally and the workpiece 36 is scanned directly above the collimator 27, moving from left to right in FIG. 5. The distance from the X-ray source to the workpiece in this equipment is about 7 inches. Collimator 27 is secured to the top of detector housing 37 which has top, middle and bottom sections 38-40. A T-shaped detector board 41 has the signal or collector electrodes and leads which bring the measured signal, indicative of detected X-ray intensity, outside of the housing and high pressure ionization chamber to be sent to a data acquisition system. This figure shows that there are dead spaces at either end of the collimator 27 and middle housing section 39.

One printed circuit detector board 41 is illustrated in FIG. 6. The collector plate 42 is divided into a plurality of wide metal strips or regions 43 which are the collector electrodes of the wide detector elements. These regions are inclined at progressively increasing angles and aimed at the X-ray source. The length of the collector plate 43 is 8 inches, the height of metal regions 43 is 1.1 inches and their width about 0.4 inches. Every detecting element has a printed circuit. lead 44 to bring out the signal.

Figure 7:
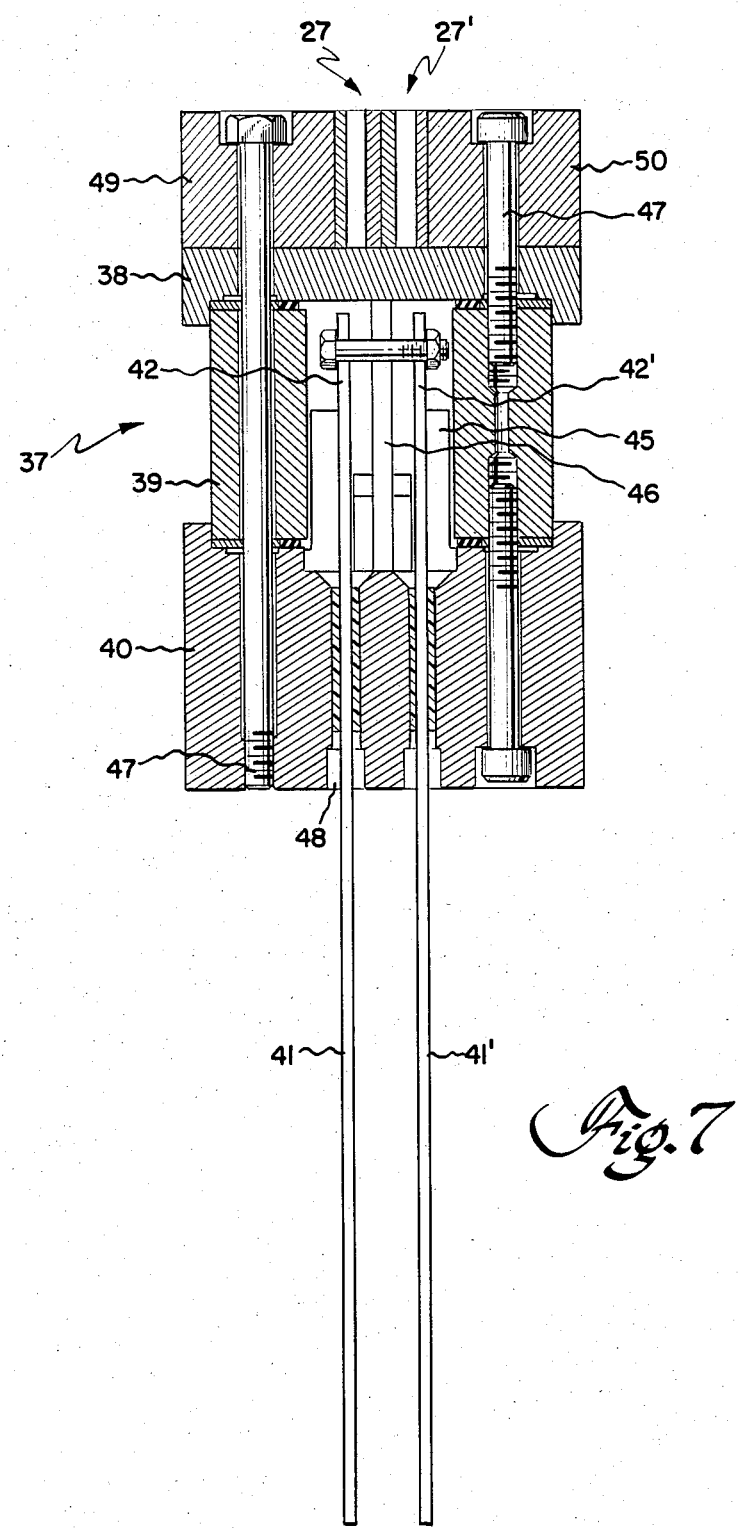
FIG. 7 is a vertical cross section through the collimator/detector taken on line 7—7 in FIG. 5.

A vertical cross section through collimator/detector 37, which actually comprises two collimator/detectors side-by-side is shown in FIG. 7. A central chamber 45 contains a long, continuous high voltage plate 46 and, on either side, the parallel collector plates 42 and 42'. The voltage plate is connected to a source of electrical potential located outside the detector providing a potential, for example, of −5000 volts, and the collector regions are near ground potential. Chamber 45 is filled with high pressure Xenon gas at 75 atmospheres, or another suitable gaseous medium. O-rings and retaining washers are provided between the top, middle and bottom housing sections 38-40, which are fastened together by bolts 47. The contact tabs of detector boards 41 and 41' pass through slots in bottom housing section 40 and are sealed and retained by epoxy seals 48.

Top housing section 38 is made of aluminum, a material transparent to X-rays, or may be steel with an aluminum window. Collimator assemblies 27 and 27' are mounted directly on top of the detector housing 37, between backing plates 49 and 50 which are secured to the housing by bolts 47. To complete the discussion of the detector array, data is needed over ±70° from the vertical. The detector array has three collimator/dectors as shown in FIGS. 5-7, six sections in all each covering a different angular range. The beam width of the incident X-ray beam is limited by the collimator to the desired resolution width. The wide detector elements collect all of the charged particles formed in that element. Ions of both polarities are formed in the element which drift under the influence of the electric field to the nearest plate of opposite polarity. Positively charged ions drift to the negative voltage plate 46, and negatively charged ions to the collector plates 42 and 42'. The latter is the measured signal outputted by the detector to signal processing circuitry.

In conclusion, a collimator system for X-ray detectors has been developed which provides much higher resolution than a conventional, stand alone X-ray detector. High resolution is becoming increasingly important in NDE systems as higher performance is required of manufactured parts. Higher resolution is important in some medical applications as well.

While the invention has been particularly shown and described with reference to a preferred embodiment thereof, it. will be understood that the foregoing and other changes in form and details may be made therein without departing from the spirit and scope of the invention.

What is claimed is:

1. A high resolution collimator/detector for a computerized tomography system having a source of X-ray beams to irradiate an object, comprising:
    an X-ray detector including an array of wide detector elements comprised of a printed circuit detector board having a collector plate divided into wide strips and a parallel voltage plate between which is impressed an electric field;
    a housing having an X-ray transparent section and a chamber containing said detector board and voltage plate and a high pressure gaseous medium to convert incident X-rays into charged particles that drift under the influence of said electric field;
    a collimator secured to said detector housing comprised of a central layer in which narrow tapered slits are cut and continuous enclosing side layers, said central layer having at the top flexure pieces each pressed toward an edge of the respective slit to yield a controlled slit width at the top of 3 mils or less to limit and define the width of X-ray beams incident on said detector elements and hence the system resolution;
    every narrow tapered slit being approximately centered on one wide detector element which collects all the charged particles formed in that element, and having a length equal to the thickness of said central layer which determines the slice thickness of said computerized tomography system.

2. The collimator/detector of claim 1 wherein said collimator layers are made of a high X-ray attenuating material such as titanium.

3. The collimator/detector of claim 2 wherein said collimator slits and detector elements are inclined at progressively increasing angles toward said X-ray source.

* * * * *